United States Patent [19]
Nishimura et al.

[11] 4,297,004
[45] Oct. 27, 1981

[54] LIQUID CRYSTAL DISPLAY CELL

[75] Inventors: Katsuo Nishimura; Takanori Nanya, both of Tokorozawa, Japan

[73] Assignee: Technical Research of Citizen Watch Co., Ltd., Tokorozawa, Japan

[21] Appl. No.: 76,189

[22] Filed: Sep. 17, 1979

[30] Foreign Application Priority Data

Sep. 20, 1978 [JP] Japan ................... 53-114487
Oct. 26, 1978 [JP] Japan ................... 53-132029

[51] Int. Cl.³ .................................... G02F 1/133
[52] U.S. Cl. ...................... 350/336; 350/334; 350/339 R
[58] Field of Search .......... 350/334, 336, 343, 339 R, 350/338

[56] References Cited

U.S. PATENT DOCUMENTS

| | | | |
|---|---|---|---|
| 3,966,302 | 6/1976 | Mikoda et al. | 350/334 |
| 4,013,344 | 3/1977 | Bescond | 350/334 |
| 4,036,550 | 7/1977 | Yih | 350/336 X |
| 4,231,640 | 11/1980 | Funada et al. | 350/336 |

*Primary Examiner*—Edward S. Bauer
*Attorney, Agent, or Firm*—Holman & Stern

[57] ABSTRACT

In the lead electrodes which connect to the display electrodes of a liquid crystal display device having lead electrodes which are of extremely narrow width and are spaced very closely together, the resistance of each lead electrode is reduced by means of a multi-layer structure of relatively low resistance, and leakage current is prevented from flowing between adjacent lead electrodes by providing a transparent insulating layer over and between the lead electrodes, thereby eliminating the deleterious effects upon display appearance of a high lead electrode resistance and leakage currents between lead electrodes.

10 Claims, 17 Drawing Figures

LIQUID CRYSTAL DISPLAY CELL

BACKGROUND OF THE INVENTION

At the present time, liquid crystal display devices are widely used in a variety of electronic equipment. In particular, liquid crystal display devices are extensively used in applications where the display area size is relatively small, while various types of information must be displayed in the display area when the equipment is switched to various different operating modes. Such applications include, for example, electronic timepieces having a number of different functions, and combined electronic timepiece/calculator devices. In such an application, due to the very large number of connections which must be made to the display electrodes of the liquid crystal display device, the density of the connecting leads provided on the liquid crystal cell substrates for connecting to the display electrodes becomes extremely high. (Such connecting leads are commonly referred to as lead electrodes, and are so designated hereinafter.) Thus, in order to accommodate a requisite number of lead electrodes on a given area of liquid crystal cell substrate, it becomes necessary to reduce the width of each lead electrode, and to reduce the spacing between the lead electrodes. This however results in several adverse effects. The lead electrodes are normally formed in the same way as the display electrodes, i.e. by evaporative deposition, and have the same thickness (i.e. measured in a direction normal to the substrate plane) as the display electrodes, which are usually sufficiently thin to be transparent. Thus, as the width of the lead electrodes is decreased, their electrical resistance increases. This effect becomes particularly noticeable when a lead electrode made of a thin film of a commonly-used material such as indium oxide ($In_2O_3$) or thin oxide ($SnO_2$) is reduced to a width of the order of 30 microns or less. The resultant increase in lead resistance may cause some areas of the display to have significantly reduced contrast, by comparison with other areas in which the lead electrode resistance is at a more normal value. Thus, areas of uneven display contrast may result. If the lead electrode resistance becomes excessively high, then failure of parts of the display may result. It can therefore be appreciated that the problem of excessively high resistance of lead electrodes in a liquid crystal display device having a very high density of lead electrodes on the cell substrates is serious, and that some method of alleviating this problem is desirable.

Another problem which arises in this respect is due to the lead electrodes being spaced very closely together. Due to this small separation between adjacent lead electrodes, leakage current can flow between them, and this can cause problems such as unwanted acitivation of certain areas of the display. In other words, display segments which should be in an "off" state may be set into an "on" state. This is especially true when the spacing between adjacent lead electrodes is reduced to the order of 30 microns or less.

SUMMARY OF THE INVENTION

The present invention is directed towards overcoming the problems described above, and to providing a liquid crystal display device in which the width of each lead electrode can be reduced to the order of 30 microns or less, and the spacing between adjacent lead electrodes can be reduced to the order of 30 microns or less, without deleterious effects upon the display operation or appearance being caused by such a narrow width and small spacing. The present invention overcomes the problem of high values of lead electrode resistance, by utilizing a multi-layer structure for the lead electrodes. One of the layers in this construction corresponds to the lead electrode of a conventional type of liquid crystal display cell, i.e. being deposited together with the transparent display electrodes, formed of the same material, and having the same thickness. In the description of preferred embodiments of the present invention given hereinafter, this layer will be referred to as the "lead electrode layer", for convenience. Beneath this layer, a thicker metallic layer is provided, integral with the lead electrode layer, and having the same width. Thus, in spite of the narrow width of the combined multi-layer lead electrode structure, the electrical resistance is held to a sufficiently low value to ensure correct operation of the display. In the descriptions of the preferred embodiments given hereinafter, the lower, thicker layer of the multi-layer lead electrode structure will be referred to as the "metal electrode layer"

DESCRIPTION OF THE PREFERRED EMBODIMENTS

The embodiments of the present invention described hereinafter are liquid crystal display cells of the twisted nematic field-effect type (FE-TN mode cells). However, since the present invention is directed towards the structure of electrodes formed upon liquid crystal cell substrates, it should be noted that the present invention is also applicable to various other types of liquid crystal display cells, including guest-host type (GH-mode) display cells providing colored displays, dynamic scattering (DS-mode) cells, etc. It should also be noted that although the described embodiments constitute liquid crystal display cells of reflection type, i.e. which are viewed by light reflected back through the cell from a rear-mounted reflector, it is equally possible to apply the present invention to liquid crystal cells which are viewed by transmitted light. However, twisted nematic type liquid crystal display cells are in widespread use at present, being suitable for such applications as electronic wristwatches, pocket calculators, etc., due to their low drive voltage requirements, low power consumption, the applicability of matrix drive techniques, and high reliability.

Figure 1:
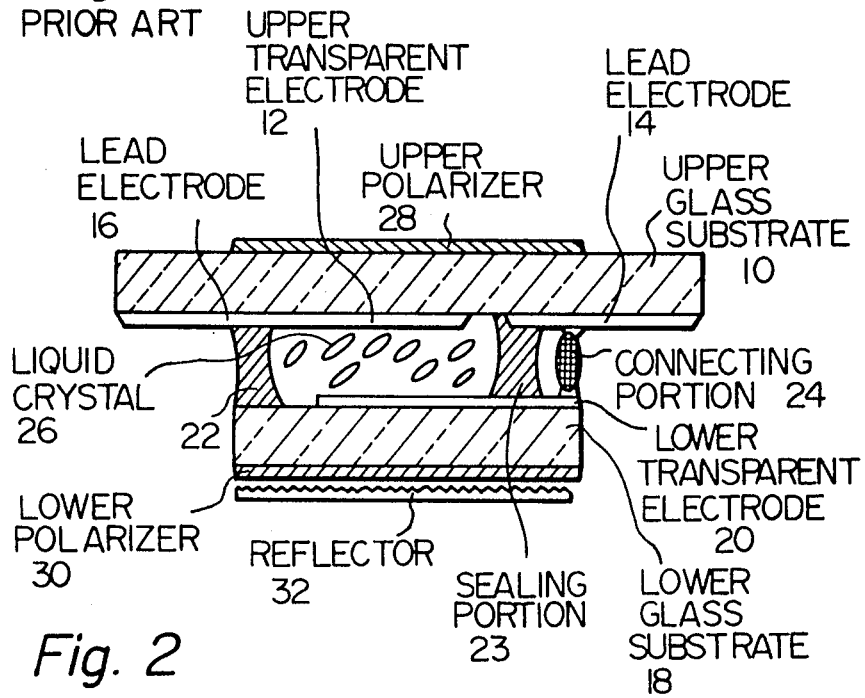
FIG. 1 is a cross-sectional view of a liquid crystal display cell having a construction known in the prior art.
Figure 2:
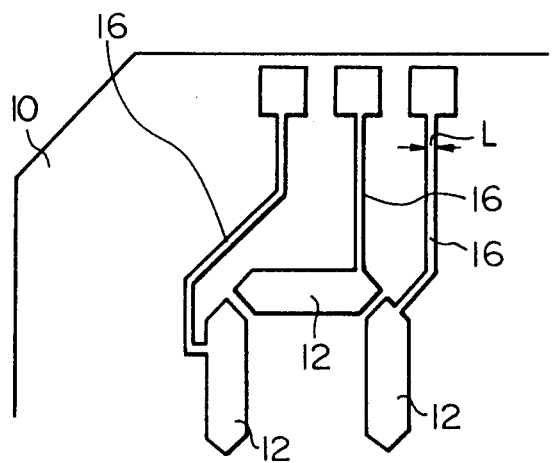
FIG. 2 is a plan view of the lead electrodes and display segment electrode structure of part of a liquid crystal display cell of the type shown in FIG. 1.

Referring now to FIG. 1, a cross-sectional view of a twisted-nematic type liquid crystal display cell of conventional form is shown, in order to assist in understanding the subsequent descriptions of the preferred embodiments. Reference numeral 10 denotes an upper glass substrate, on which is formed an upper transparent electrode 12. Electrode 12 is one of a group of display electrodes, which are usually in the form of segment electrodes as indicated in FIG. 2, which shows a plan view of part of the liquid crystal cell of FIG. 1. Numerals 14 and 16 denote lead electrodes, which provide electrical connection to the display electrode 12 and to a lower transparent electrode 20, from an external drive voltage source. A connecting portion 24, consisting of a conductive substance such as silver paste, provides connection between lead electrode 14 and lower transparent electrode 20. Lead electrodes 16 and 14 and transparent electrodes 14 and 20 consist of thin films which are mainly composed of indium oxide ($In_2O_3$), tin oxide ($SnO_2$) or a similar substance. Numeral 18 denotes a lower glass substrate which has lower transparent electrode 20 formed on an upper surface. Polarization of light passing through the liquid crystal cell is performed by an upper polarizer 28 and a lower polarizer 30, provided on exterior surfaces of upper glass substrate 10 and lower glass substrate 18. A reflector 32 is provided beneath the lower polarizer 30. Substrates 10 and 18 are spaced apart by a gap which is usually within the range 5 to 10 microns, and are sealed around their periphery by a sealing portion 23, which may consist of glass having a low melting point. A P-type nematic crystal 26 is enclosed between substrates 10 and 18.

FIG. 2 is a plan view illustrating part of the liquid crystal cell of FIG. 1, showing the arrangement of the lead electrodes 16 and upper transparent electrodes 12, which are in the form of a plurality of segment electrodes in this example. The width of each of the lead electrodes 16 is denoted as L.

If the width L of the lead electrodes 16 is reduced excessively, say to the order of 30 microns or less, then the resistance of the lead electrodes may increase to such a degree that display contrast becomes uneven. In other words, due to the high resistance of the lead electrodes, the actual drive voltage applied to some of the segment electrodes 12 may become insufficient to turn to segment fully into the "on" state. This might occur, for example, with the leftmost lead electrode 16 shown in FIG. 2, so that the segment electrode 12 connected thereto might not be turned fully to the "on" state. The lead electrode resistance may become as high as 100 to 500 kiloohms. If it is attempted to compensate for this increase in the lead electrode resistance by increasing the drive voltage levels applied to the liquid crystal cell, then a higher power consumption will result, and it will be necessary to use a driver IC of relatively high breakdown voltage. Some means of reducing the lead electrode resistance is therefore highly desirable.

Figure 3:
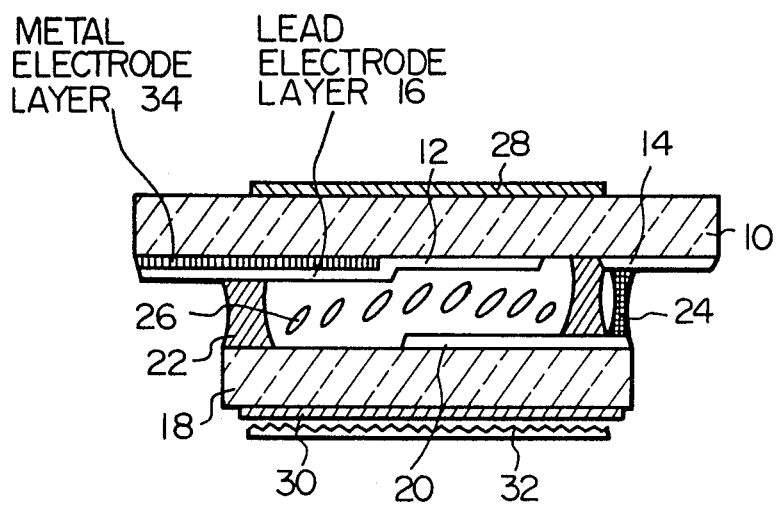
FIG. 3 is a cross-sectional view of a first embodiment of a liquid crystal display cell according to the present invention.

Referring now to FIG. 3, a first embodiment of the present invention is shown. This embodiment is a nematic liquid crystal display cell which is basically similar to the prior art liquid crystal cell described above, with the exception of the electrode structure, and so similar components to the prior art cell described above are indicated by identical numerals. Reference numeral 34 denotes a metal electrode layer, which is provided beneath, and integral with, a lead electrode layer 16. Lead electrode layer 16 comprises a very thin film, as in the case of the lead electrodes of a conventional liquid crystal cell. The metal electrode layer 34 may be composed of a lower layer of metal such as chromium, in order to obtain good adhesion to the glass substrate surface, and an upper layer of gold, for low resistance. Since the multi-layer lead electrode structure will not be transparent, due to its overall thickness, it will be visible. However, in most applications for which a liquid crystal display cell is used, a mask plate is provided around the periphery of the display area in order to conceal wiring connections, etc. It will usually be possible to conceal the lead electrodes by such a mask, wholly or partially, so that the visibility of the lead electrodes does not present a significant problem.

Figure 4:
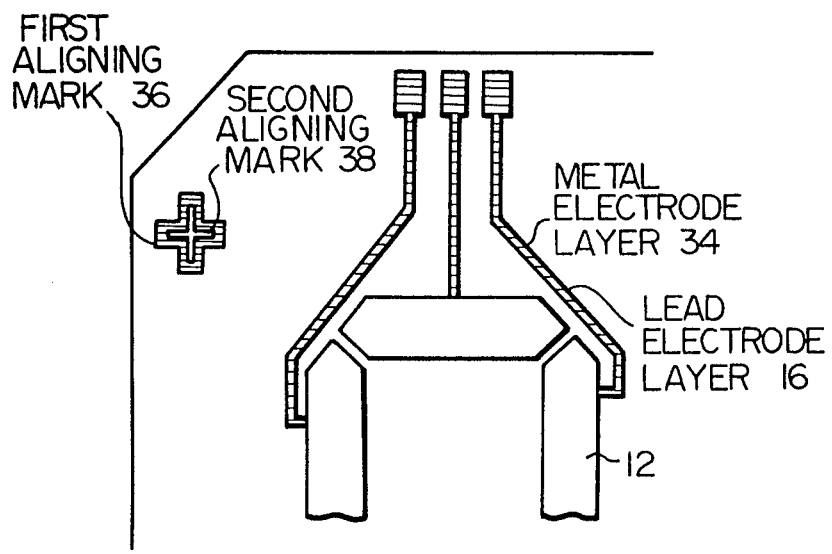
FIG. 4 is a plan view of the lead electrodes and display segment electrodes of part of the liquid crystal display cell embodiment of FIG. 3.

FIG. 4 is a plan view of part of the display cell of FIG. 3, showing the lead electrode arrangement. Numerals 36 and 38 denoted aligning marks, which are used in forming the multi-layer lead electrodes. Such aligning marks are necessary due to the very small width of the lead electrodes.

Figure 5:
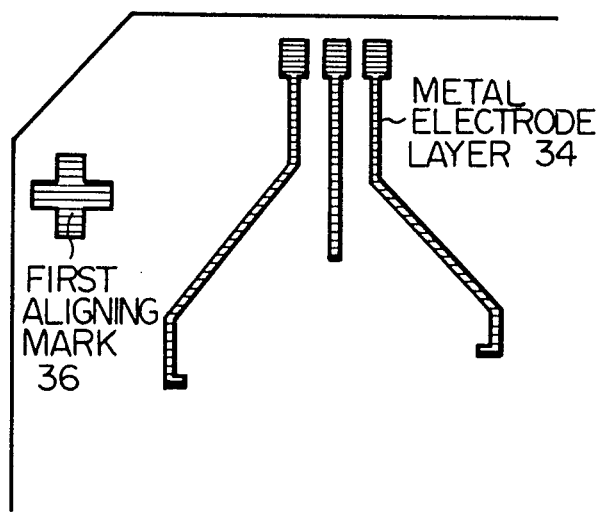
FIG. 5 is a plan view of the lead electrode structure of the first embodiment of FIG. 3, illustrating a manufacturing stage at which a metallic electrode layer is formed.

The manufacturing process for forming transparent display electrodes (i.e. segment electrodes 12 of FIG. 4) and multi-layer lead electrodes in accordance with the present invention will now be described. It will be assumed that a metal electrode layer consisting of a layer of chromium and a layer of gold is used. However, it is also possible to utilize various other conductive materials to form the metal electrode layer. In the first stage, a layer of chromium is formed over the entire surface of a glass substrate, by evaporative deposition or by sputtering. A thin film of gold is then formed over the chromium layer. A photo-resist material is then formed over the gold film, by a spinner method, and the desired pattern of lead electrodes is formed in the photo-resist by exposure to light and development. The unnecessary portions of the gold film and chromium layer are then removed by etching. The gold film may be etched by aqua regia, and the chromium layer etched by a mixture of perchloric acid, cerium nitrate ammonium and water, in the proportions 10 ml: 20 grams: 500 ml, respectively. In this stage, a first aligning mark 36 is formed, in the same manner as the metal electrode layer. The substrate surface now appears as shown in FIG. 5, with a two-layer (gold and chromium) metal electrode layer 34 deposited, together with first aligning mark 36.

Figure 6:
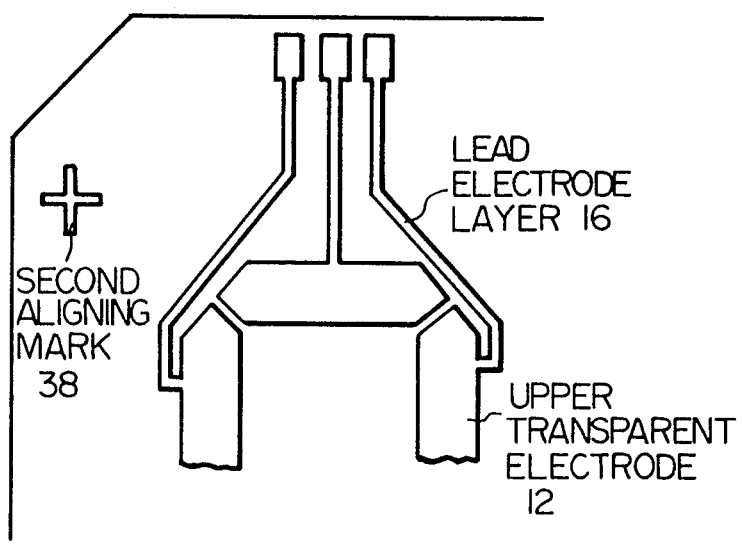
FIG. 6 is a plan view of the first embodiment, illustrating a manufacturing step in which a transparent segment electrode and lead electrode layer is formed.

A conductive transparent film of indium oxide or tin oxide is now formed over the entire surface of the glass substrate, over the metal electrode layer 34. Etching is then performed on this transparent conductive layer, to form a lead electrode layer 16 and transparent display electrode layer 12 on the substrate surface, this pattern having the form shown in FIG. 6. As a result of these steps, a pattern of multi-layer lead electrodes and of transparent display electrodes 12 is formed, together with the first and second aligning marks 36 and 38, as shown previously in FIG. 4. The aligning marks 36 and 38 enable the alignment of the metal electrode layer 34 with the transparent lead electrode layer 12 to be accurately performed, using mask alignment aquipment for this purpose, wich enables alignment to be performed to an accuracy of a few microns.

In this way, a multi-layer lead electrode structure having an electrical resistance considerably smaller than that obtainable with thin-film lead electrodes alone can be produced.

Figure 7:
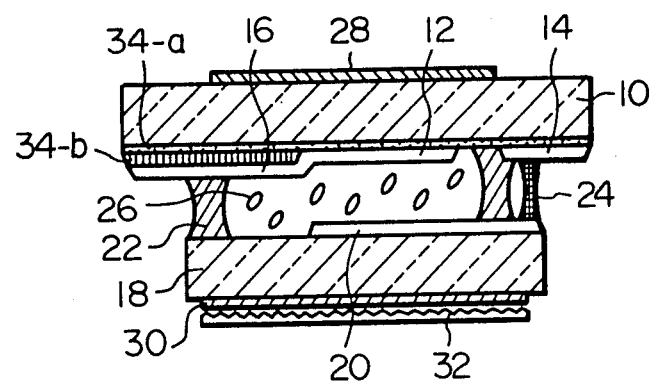
FIG. 7 is a cross-sectional view of a second embodiment of a liquid crystal display cell according to the present invention, in which a layer of chromium is deposited beneath the metallic electrode and lead electrode layers.

Another embodiment of a liquid crystal display cell according to the present invention will now be described, with reference to FIG. 7. In this embodiment, a two-layer structure composed of a lower layer of chromium 34-$a$ and an upper layer of gold 34-$b$ is used for the metal electrode portion of each multi-layer lead electrode. However, only the gold layer 34-$b$ is etched, and the chromium layer 34-$a$ is left covering the entire surface of the cell substrate. The chromium layer may be held to a thickness of less than about 20 or 30 angstroms, in order to be transparent, or, if transparency is not necessary, can be made about 200 angstroms. The chromium film can be made non-conductive by heat treatment, to cover it to chromium oxide film, after etching of the gold film has been performed. Subsequently, the lead electrode layer and display electrodes can be formed by depositing and etching a thin conductive film on the gold and chromium layers, as described for the first embodiment of the present invention. Thus, this second embodiment enables a simplification in manufacturing to be achieved, since it is not necessary to perform etching of the chromium layer.

Figure 8:
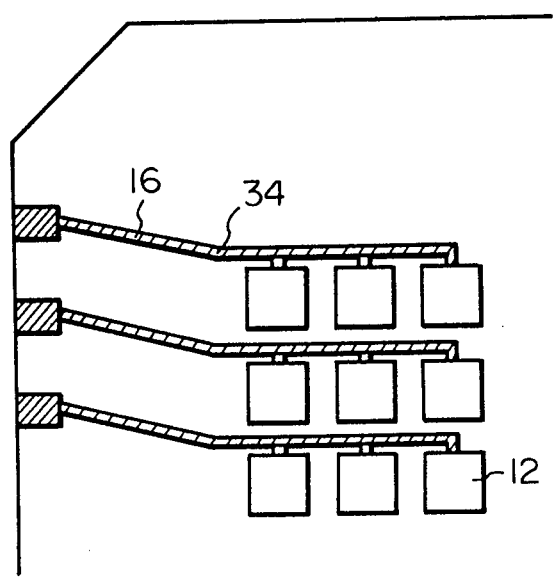
FIG. 8 is a plan view of part of the lead electrode and display electrode structure of a third embodiment of the present invention, in which display electrodes are in the form of a dot matrix array.

A third embodiment of the present invention is shown in FIG. 8. This is a liquid crystal display cell having transparent electrodes 12 in the form of small rectangles, constituting a dot-matrix array of display electrodes. Each of the lead electrodes connecting the three sets of display electrode dots shown is a multi-layer lead electrode composed of a metal electrode layer 34 formed as described for the first or second embodiments above, and a thin-film lead electrode layer 16. Only the display electrode pattern of one substrate is shown in FIG. 8. Multi-layer lead electrodes in accordance with the present invention may also be utilized to connect the display electrodes of the opposite substrate, which are not shown in FIG. 8.

Figure 9:
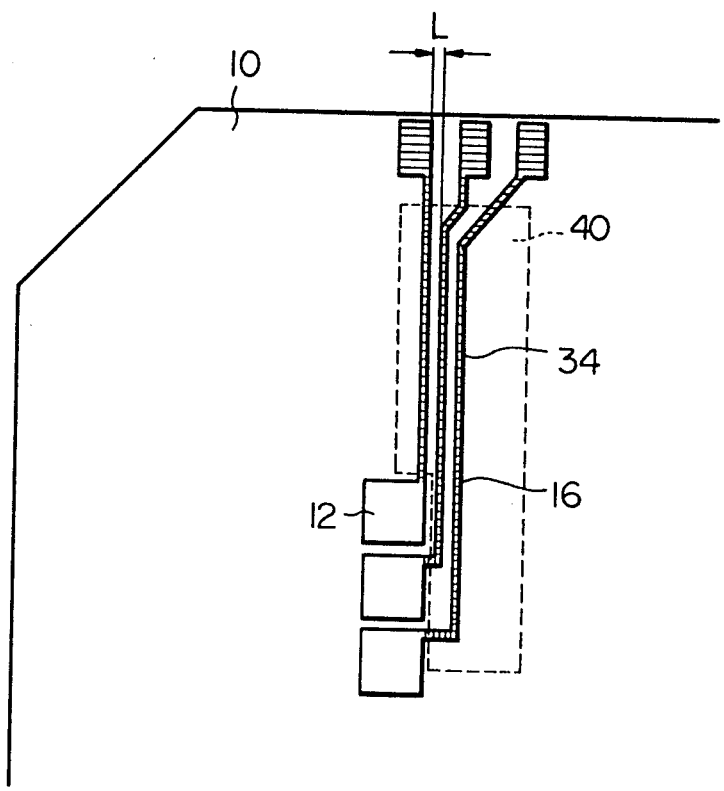
FIG. 9 is a plan view of part of the lead electrode and display electrode structure of a fourth embodiment of the present invention, in which a transparent insulating layer is deposited over and betweeen lead electrodes which are arranged closely adjacent to one another.

Referring now to FIG. 9, a fourth embodiment of the present invention is shown. Numeral 34 and 16 denote the metallic electrode layer and lead electrode layer respectively of a multi-layer lead electrode formed as described in accordance with the first or second embodiments above. The spacing between each of the lead electrodes is very small, of the order of 30 microns or less. Such a small spacing can result in leakage currents flowing between adjacent lead electrodes, causing deleterious effects upon the liquid crystal display. To prevent the flow of such leakage currents, therefore, a transparent insulating layer 40 is formed over and between the lead electrodes. This transparent insulating layer can be formed over portions of the substrate where lead electrodes become closely spaced together, by a masking technique, as described hereinafter. The transparent insulating layer can be composed of a material such as aluminum oxide $Al_2O_3$, silicon oxide $SiO_2$, silicon nitride $Si_3N_4$, etc. The thickness of the transparent insulating layer 40 can be of the order of 0.1 to 3 micons.

Figure 10:
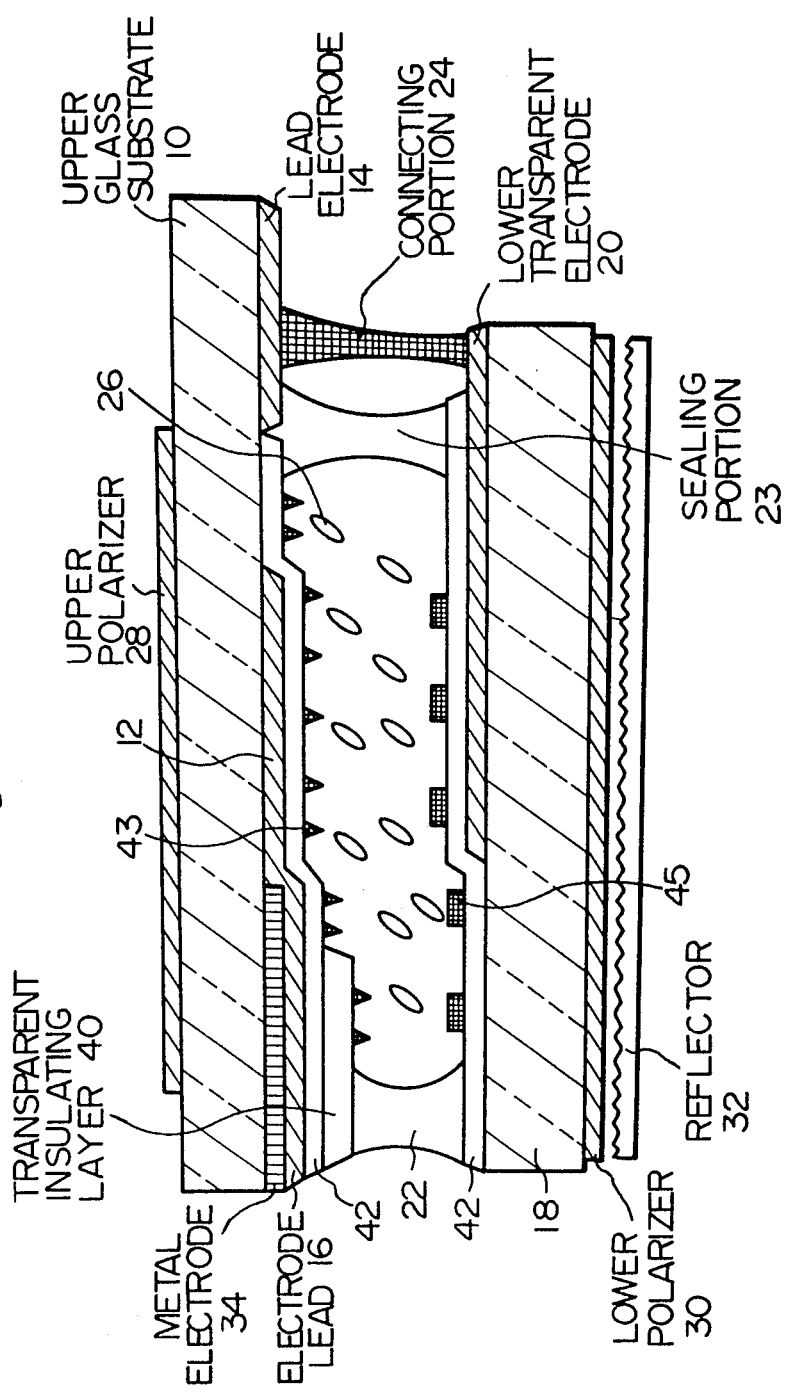
FIG. 10 is a cross-sectional view of the structure of a liquid crystal display cell according to the fourth embodiment of the present invention.

FIG. 10 is a diagram illustrating in cross-section of a liquid crystal display cell according to this fourth embodiment of the present invention. Numeral 34 denotes a metal electrode layer of a multi-layer lead electrode, composed of a lower layer of chromium and an upper layer of gold, for example, as described for the previous embodiments of the present invention. The metal electrode layer is covered by a lead electrode layer 16, which connects to a transparent electrode 12. A coating layer 42 is provided over the entirety of the multi-layer lead electrodes, the display electrode 12, and adjacent areas of the glass substrate 10. This coating layer 42 can consist of a transparent film of silicon oxide $SiO_2$ having a thickness of the order of 200 angstroms to 800 angstroms. This layer prevents soda from being educed from the glass substrate 10. Numeral 40 denotes a transparent insulating layer as described above. A coating layer 42 is also provided over a lower substrate 20, over a lower transparent electrode 20. Numerals 43 and 45 denote molecular alignment layers, provided to promote alignment of molecules of a liquid crystal material 26 in a desired orientation before a drive voltage is applied between the display electrodes. For the sake of simplicity of description, such molecular alignment layers have been omitted from the descriptions of the previous embodiments of the present invention, although they are normally provided with a twisted nematic mode liquid crystal cell.

Figure 11:
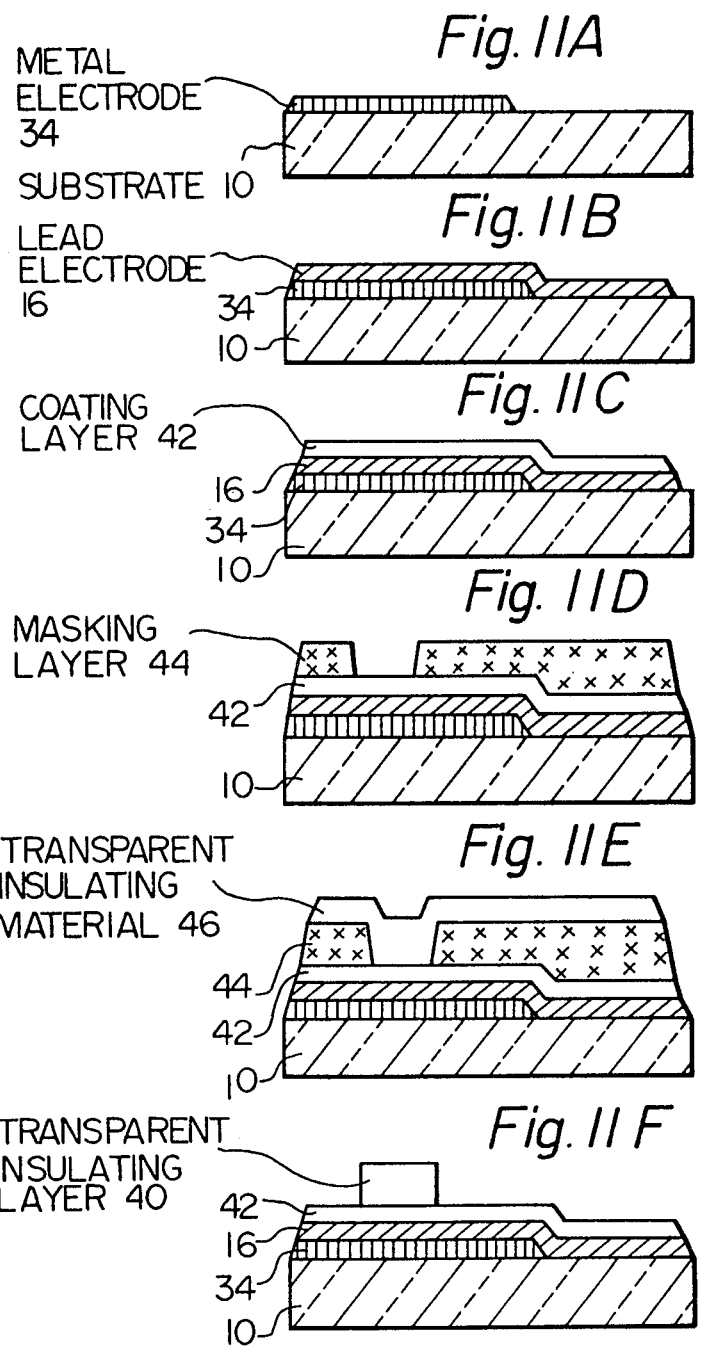
FIGS. 11A, 11B, 11C, 11D, 11E and 11F are cross-sectional diagrams illustrating successive stages in the manufacture of a cell substrate having a lead electrode layer, metal electrode layer, and transparent insulating layer, as shown in the embodiment of FIGS. 9 and 10.

The process by which a cell substrate according to the fourth embodiment of the present invention is manufactured will now be described, with reference to FIGS. 11A to 11F. First, as shown in FIG. 11A, a metal electrode layer 34 composed, for example of a layer of gold on a layer of chromium is formed, as described for the first and second embodiments of the present invention, on a glass substrate 10. A lead electrode layer 16 composed of a thin film of material such as tin oxide is then formed over the lead electrode layers, and integral with a display electrode 12. A transparent coating layer of material such as silicon oxide is then formed over the lead electrodes, display electrodes 12, and surrounding areas of the surface of substrate 10, as shown in FIG. 11C. A layer 44 of a masking material is then formed over the coating layer. The masking layer 44 can be formed by printing masking ink by a screen printing process, or by applying photo-resist and exposing and developing the photo-resist through a mask. Then, as shown in FIG. 11E, a layer of transparent insulating material such as $Al_2O_3$, $SiO_2$, or $Si_3N_4$ is formed over the masking layer by means such as evaporative deposition or by sputtering.

Finally, as shown in FIG. 11F, the masking layer 44 is washed off, leaving the transparent insulating layer 40 deposited on the appropriate portion of the lead electrodes.

Figure 12:
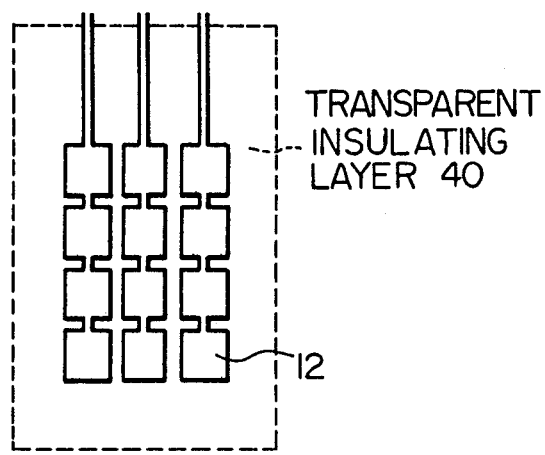
FIG. 12 is a plan view of a cell substrate having display electrode elements situated closely together.

It is also posslble to provide a layer of transparent insulating material over the display electrodes, and between them, as well as over the lead electrodes. In this case, the layer of transparent insulating material provided over the display electrodes would be made thinner than that provided over the lead electrodes. Thia may be helpful in reducing leakage current flow between adjacent display electrodes, when the display electrodes are spaced very closely together. An example of such a case is shown in FIG. 12, in which the display electrodes 12 are in the form of a dot-matrix array, with the display electrode elements spaced very closely together.

It should also be noted that the transparent coating layer 42 described for the fourth embodiment of the present invention may not be necessary in some cases, and may be omitted.

Although the described embodiments have been specified as utilizing various specific metallic and other substances, it should be understood that it is also possible to utilize other substances for the purposes described, without deparing from the scope claimed for the present invention.

Various other changes and modifications to the described embodiments are possible, which fall within the scope claimed for the present invention, as given by the appended claims.

What is claimed is:

1. In a liquid crystal display cell composed of two transparent supporting substrates arranged parallel to one another, sealed together peripherally to form an enclosed chamber containing a liquid crystal material, and having a transparent display electrode formed on an inner face of at least one of said transparent supporting substrates composed of a thin film of an electrically conductive substance and a lead electrode provided on said inner substrate face for providing electrical connection between said transparent display electrode and external drive means, the improvement comprising a multi-layer construction for said lead electrode for thereby reducing the electrical resistance thereof, said multi-layer lead electrode construction comprising a metallic electrode layer of a metallic substance formed on said inner substrate face and a lead electrode layer formed over said metallic electrode layer, said lead electrode layer being formed integrally with said display electrode and having a width which is substantially equal to the width of said metallic electrode layer, measured in a direction parallel to the substrate plane.

2. The improvement according to claim 1, in which said metallic electrode layer is composed of a first layer of chromium deposited directly on said inner substrate face and a second layer of gold formed over said layer of chromium.

3. The improvement according to claim 2, in which said layer of chromium is formed substantially over the entirety of said inner substrate face.

4. The improvement according to claim 1, in which said lead electrode has a width of less than 30 microns.

5. The improvement according to claim 1, in which a plurality of said lead electrodes are provided on said inner substrate face and situated closely adjacent to one another, and further comprising a transparent insulating layer formed over and between said plurality of lead electrodes.

6. The improvement according to claim 5, in which said transparent insulating layer is formed from a substance selected from a group including $Al_2O_3$, $SiO_2$, and $Si_3N_4$.

7. The improvement according to claim 5, and further comprising a transparent coating layer formed between said transparent insulating layer and said plurality of lead electrodes.

8. The improvement according the claim 7, in which said transparent coating layer is composed of $SiO_2$.

9. The improvement according to claim 6, in which said transparent insulating layer has a thickness which is in the range of 0.1 to 3 microns.

10. The improvement according to claim 8, in which said transparent coating layer has a thickness which is in the range of 200 to 800 Angstroms.

* * * * *